United States Patent
Knighton et al.

(10) Patent No.: US 6,856,407 B2
(45) Date of Patent: Feb. 15, 2005

(54) METHOD FOR DEPTH DETECTION IN 3D IMAGING PROVIDING A DEPTH MEASUREMENT FOR EACH UNITARY GROUP OF PIXELS

(75) Inventors: Mark S. Knighton, Santa Monica, CA (US); David S. Agabra, Pacific Palisades, CA (US); William D. McKinley, Marina Del Rey, CA (US)

(73) Assignee: NextEngine, Inc., Santa Monica, CA (US)

(*) Notice: Subject to any disclaimer, the term of this patent is extended or adjusted under 35 U.S.C. 154(b) by 541 days.

(21) Appl. No.: 09/839,755

(22) Filed: Apr. 19, 2001

(65) Prior Publication Data

US 2002/0033955 A1 Mar. 21, 2002

Related U.S. Application Data

(63) Continuation-in-part of application No. 09/660,809, filed on Sep. 13, 2000, now Pat. No. 6,639,684.

(51) Int. Cl.[7] .............................................. G01B 11/24
(52) U.S. Cl. ....................................................... 356/601
(58) Field of Search ................................. 356/601, 602, 356/603, 610

(56) References Cited

U.S. PATENT DOCUMENTS

| | | | |
|---|---|---|---|
| 3,636,250 A | | 1/1972 | Haeff |
| 4,089,608 A | | 5/1978 | Hoadley |
| 4,443,706 A | * | 4/1984 | DiMatteo et al. ........... 356/610 |
| 4,564,295 A | | 1/1986 | Halioua |
| 4,590,608 A | | 5/1986 | Chen et al. |
| 4,641,972 A | | 2/1987 | Halioua et al. |
| 4,657,394 A | | 4/1987 | Halioua |
| 4,705,401 A | | 11/1987 | Addleman et al. |
| 4,724,525 A | | 2/1988 | Purcell et al. |
| 4,737,032 A | | 4/1988 | Addleman et al. |
| 4,802,759 A | | 2/1989 | Matsumoto et al. |
| 4,846,577 A | | 7/1989 | Grindon |
| 5,067,817 A | | 11/1991 | Glenn |
| 5,131,844 A | | 7/1992 | Marinaccio et al. |
| 5,132,839 A | | 7/1992 | Travis |
| 5,135,309 A | | 8/1992 | Kuchel et al. |
| 5,175,601 A | | 12/1992 | Fitts et al. |

(List continued on next page.)

FOREIGN PATENT DOCUMENTS

| | | | | |
|---|---|---|---|---|
| DE | 4134546 A1 | 8/1993 | ........... G01B/11/03 |
| JP | 09074536 | 3/1997 | |
| WO | WO 96/02106 | 1/1996 | |
| WO | WO 99/41900 | 8/1999 | |
| WO | WO 01/81859 | 11/2001 | |
| WO | WO 02/23887 | 3/2002 | |

OTHER PUBLICATIONS deskeng.com/3dd.htm, "Desktop Engineering, The Complete Computing Resource for Engineers," 1977 Helmers Publishing, Inc., 1 page.
www.geometrixinc.com/mainwin.html, "Who says you can't build Rome in a day?", 4 pages.
www.pointcloud.com/pages/Home.html, "Point Cloud," 5 pages.
www.inharmonytech.com/venus3d.index.html, "Introducing Venus 3D," 4 pages.

Primary Examiner—Richard A. Rosenberger
(74) Attorney, Agent, or Firm—Blakely, Sokoloff, Taylor & Zafman, LLP

(57) ABSTRACT

A method and apparatus for obtaining up to one depth measurement for each pixel. A image sensing array (ISA) captures a measurement of intensity on a surface. The intensity maps to depth. Accordingly, from a single pixel, or a group of pixels without regard to the intensity distribution among the pixels in the group, a depth measurement can be obtained independently of any and/or all data captured by other pixels in the array.

12 Claims, 3 Drawing Sheets

U.S. PATENT DOCUMENTS

| | | |
|---|---|---|
| 5,216,817 A | 6/1993 | Misevich et al. |
| 5,218,427 A | 6/1993 | Koch |
| 5,231,470 A | 7/1993 | Koch |
| 5,285,397 A | 2/1994 | Heier et al. |
| 5,289,264 A | 2/1994 | Steinbichler |
| 5,307,292 A | 4/1994 | Brown et al. |
| 5,315,512 A | 5/1994 | Roth |
| 5,335,317 A | 8/1994 | Yamashita et al. |
| 5,337,149 A | 8/1994 | Kozah et al. |
| 5,377,011 A | 12/1994 | Koch |
| 5,414,647 A | 5/1995 | Ebenstein et al. |
| 5,432,622 A | 7/1995 | Johnston et al. |
| 5,444,537 A * | 8/1995 | Yoshimura et al. ......... 356/603 |
| 5,471,303 A | 11/1995 | Ai et al. |
| 5,531,520 A | 7/1996 | Grimson et al. |
| 5,592,563 A | 1/1997 | Zahavi |
| 5,611,147 A | 3/1997 | Raab |
| 5,617,645 A | 4/1997 | Wick et al. |
| 5,627,771 A | 5/1997 | Makino |
| 5,636,025 A | 6/1997 | Bieman et al. |
| 5,646,733 A | 7/1997 | Bieman |
| 5,661,667 A | 8/1997 | Rueb et al. |
| 5,678,546 A | 10/1997 | Truppe |
| 5,689,446 A | 11/1997 | Sundman et al. |
| 5,704,897 A | 1/1998 | Truppe |
| 5,747,822 A | 5/1998 | Sinclair et al. |
| 5,771,310 A | 6/1998 | Vannah |
| 5,794,356 A | 8/1998 | Raab |
| 5,799,082 A | 8/1998 | Murphy et al. |
| 5,805,289 A | 9/1998 | Corby, Jr. et al. |
| 5,831,621 A | 11/1998 | Pito |
| 5,864,640 A | 1/1999 | Miramonti et al. |
| 5,870,220 A | 2/1999 | Migdal et al. |
| 5,880,846 A | 3/1999 | Hasman et al. |
| 5,907,359 A | 5/1999 | Watanabe |
| 5,910,845 A | 6/1999 | Brown |
| 5,944,598 A | 8/1999 | Tong et al. |
| 5,988,862 A | 11/1999 | Kacyra et al. |
| 5,995,650 A | 11/1999 | Migdal et al. |
| 5,999,641 A | 12/1999 | Miller et al. |
| 6,057,909 A | 5/2000 | Yahav et al. |
| 6,091,905 A | 7/2000 | Yahav et al. |
| 6,100,517 A | 8/2000 | Yahav et al. |

\* cited by examiner

METHOD FOR DEPTH DETECTION IN 3D IMAGING PROVIDING A DEPTH MEASUREMENT FOR EACH UNITARY GROUP OF PIXELS This is a continuation-in-part of Ser. No. 09/660,809, filed on Sep. 13, 2000, now U.S. Pat. No. 6,639,684, entitled DIGITIZER USING INTENSITY GRADIENT TO IMAGE FEATURES OF THREE-DIMENSIONAL OBJECTS.

BACKGROUND

1. Field of the Invention

The invention relates to depth detection. More specifically, the invention relates to using individual pixels or elementary groups of pixels to determine distance from a reference.

2. Background

Various 3D imaging techniques exist for capturing three dimensional representations of three dimensional objects. To effect these captures it is necessary to determine depth from a reference point for each point represented. One way this has been done in the past is using a laser which sweeps over the target object. As the laser sweeps, the spot reflects off the object and strikes an image sensing array ("ISA") where the spot strikes the ISA and indicates the depth of that point on the target from which it was reflected. Only a single depth measurement is captured for each captured period using this method. If we assume an ISA has 5,000 pixels, this implies a ratio of 1 to 5,000 in terms of depth measurements per pixel.

Another common technique is to capture a projected pattern and interpret the distortion of the projected pattern. Using this technique, it is necessary to contextualize the distortion with the readings from adjacent pixels in order to identify and interpret a depth measurement for a particular location. While this technique improves the depth measurement per pixel ratio over the laser method discussed above, each measurement is dependent on the values captured by surrounding pixels and the ratio does not approach 1 to 1.

Ultimately, the maximum resolution of a 3D image captured during a period of time is limited by the number of depth measurements that can be derived during that time period from the ISA. Maximum resolution and speed is achieved where each pixel provides a depth measurement for each capture period.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
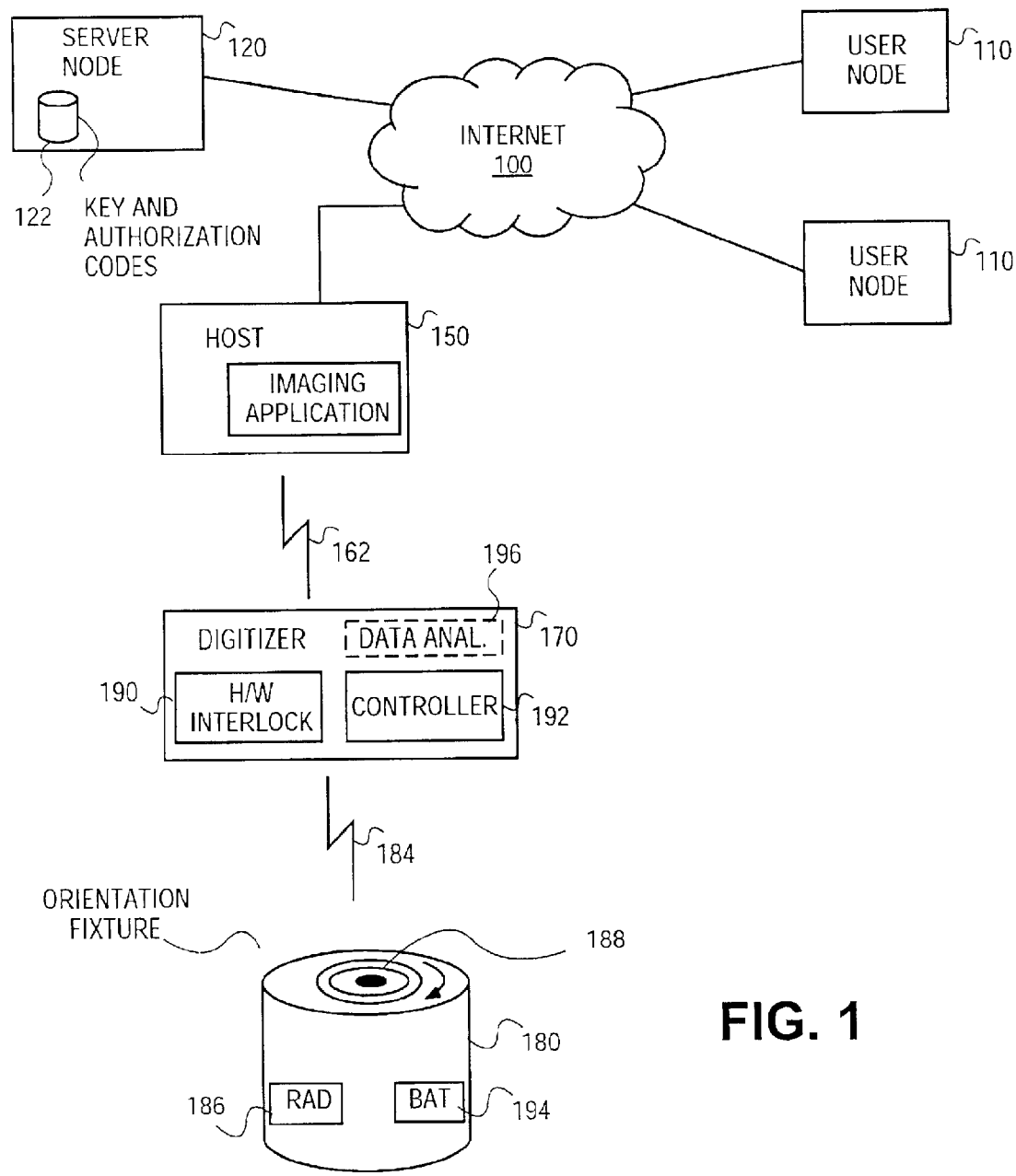
FIG. 1 is a block diagram of a system of one embodiment of the invention.

FIG. 1 is a block diagram of a system of one embodiment of the invention. The distributed network 100 such as the Internet provides an interconnection between a plurality of user nodes 110, a server node 120 and a host 150. Server node 120 may be any conventional server or a collection of servers to handle traffic and requests over the distributed network. User nodes may be discrete computers running on their web browser, a corporate network, another server site, or any other node on the distributed network. Host 150 may be a computer (laptop, desktop, hand-held, server, workstation, etc.), an internet appliance or any other device through which data may be forwarded across the distributed network.

The host 150 may communicate over a large wire link such as a universal serial bus (USB) or wireless link 162 to a digitizer 170. The digitizer 170 may be any of the myriad noncontact digitizers. One suitable digitizer is described in copending patent application Ser. No. 09/660,809, entitled DIGITIZER USING INTENSITY GRADIENT TO IMAGE FEATURES OF THREE-DIMENSIONAL OBJECTS and assigned to the assignee of the instant application.

In one embodiment, digitizer 170 is physically independent of an orientation fixture 180. For user convenience, it is desirable to minimize space permanently allocated to the system and minimize setup time. Most users will not be able to allocate sufficient space to leave the system configured for use at all times. The user will therefore be required to reintroduce some portion of the system prior to each use. The need to swap cables and otherwise rewire serves as a significant deterrent to wide spread consumer adoption.

As used herein, "physically independent" means that no mechanical or wired electrical connection must exist between the physically independent units during operation. By way of example and not limitation, two devices coupled together by an electrical signaling wire either directly or through a host computer, are not physically independent, whereas two devices that have no physical coupling and communicate over a wireless link are deemed "physically independent." Connection to a common power source, e.g., two outlets in a house, is not deemed to destroy physical independence.

Orientation fixture 180 repositions an object to be digitized by digitizer 170 such that different aspects of the object are exposed relative to the digitizer at different points in time. In one embodiment the orientation fixture 180 is a turntable. One suitable turntable is described in copending application Ser. No. 09/660,810 entitled WIRELESS TURNTABLE and assigned to the assignee of the instant application. Orientation fixture may also be a robotic arm or other robotic device, or maybe a turntable in conjunction with a robotic arm or other robotic device. Other mechanisms that are capable of exposing different aspects of an object relative to the digitizer are deemed to be within the ambit of orientation fixtures.

As previously noted the orientation fixture is physically independent of the digitizer. One premise of the system is relative ease of setup to facilitate wide acceptance. Thus, with the physical independence it is desirable that the digitizer 170 and orientation fixture 180 be able to "find" each other. To that end, the digitizer 170 may be equipped to sweep an area looking with its sensing apparatus for a feature of the orientation fixture 180. The orientation fixture 180 may include a feature such as indicia, for example, acquisition indicia 188, or may contain some other physically observable structure that permits the digitizer to identify and acquire the orientation fixture 180 without the user introducing or removing a separate reference object. Acquiring the orientation fixture may permit, for example, any of automatic calibration of the digitizer, automatic determination of the relative position of the digitizer and orientation fixture, and fixture's orientation or condition. In one embodiment, imaging the feature provides an indication of focal distance as the perspective of the feature varies in a known way with distance. Calibration may be performed by imaging the feature and comparing the results to a set of reference data corresponding to the feature. In this manner the digitizer settings can be automatically optimized to provide the best available accuracy under existing conditions. Alternatively, the calibration can be performed based on a reference target or path entirely within the digitizer.

Alternatively, the orientation fixture may have a localized radiation source 186, which permits the digitizer 170 to sweep and identify the location of the orientation fixture based on the localized radiation from radiation source 186. It is also within the scope and contemplation of the invention to have the orientation fixture 170 position itself relative to the digitizer, such that the orientation fixture controls the acquisition by the digitizer 170 of the orientation fixture 180 and the object to be oriented thereby. In the system of such embodiment the orientation fixture would likely be a mobile robotic unit.

In one embodiment, the digitizer communicates with the orientation fixture across a wireless link 184 to coordinate the orientation of the object with image capture by the digitizer. The wireless link may be infrared ("IR"), radio frequency ("RF"), optical signaling, or any other mode of wireless communication. In one embodiment the orientation fixture 180 includes a self contained power source 194 such as a battery. The self-contained power source 194 may also be a solar panel, fuel cell, or any other suitable power source.

In one embodiment of the invention, digitizer 170 captures information about an object positioned by orientation fixture 180 from which a three-dimensional model can be derived. Controller 192 in digitizer 170 controls the coordination between the data capture by digitizer 170 and aspect change by the orientation fixture 180. It is within the scope and contemplation of the invention for the controller to reside in the host, the digitizer, the orientation fixture or in an independent unit. References to the controller herein are deemed to include without limitation all of these options. The digitizer 170 may also include a data analyzer 196 that reviews captured data to find errors, anomalies or other points of interest that warrant further investigation, including possibly rescanning the corresponding area. After any corrective action, the data captured by digitizer 170 is passed to the host 150, which renders the three-dimensional model from the data. The host 150 may perform compression or any other manipulation of the data known in the art. The three-dimensional model may then be sent over distributed network 100 to remote nodes such as user nodes 110 or a server node 120. This provides maximum ease of distribution across the distributed network 100.

In some cases, control of distribution of information captured by the digitizer is desirable, for example, to facilitate administration of user fees. To that end, in one embodiment the digitizer is provided with a hardware interlock 190 which prevents the system from operating without first receiving authorization. Such authorization may be provided by the server node 120 sending authorization data across the distributed network. Alternative locking mechanisms such as software or firmware-based locking mechanisms may also be employed either within the digitizer 170 or the host 150. Further security of the system can be affected by requiring an imaging application 152 on the host 150 to provide a valid digital signature in addition to the authorization data before enabling capture and/or transfer of captured data from the digitizer 170 to the host 150.

Some embodiments of the digitizer 170 may encrypt the data captured prior to sending it to the host 150. In that event, unless the host is able to decrypt the data to render it, it may forward it on to the server node 120 across the distributed network and subsequent rendering of the image or three-dimensional model would occur on the server node 120. In this manner, the local user does not have access to the data from which the three-dimensional model may be derived unless a key is provided. In still another embodiment, the host 150 may include encryption capabilities and encrypt the rendered image before forwarding it on to the server node 120. Keying information may be provided to the digitizer and/or the host by the server node 120. The server node may maintain keying information and authorization data in a local data base 122. Once the three-dimensional data is safely controlled by the server node 120, access to the data may be made available for free or at cost to the user nodes 110 or back to the host 150.

The digitizer may also include a field programmable gate array ("FPGA") or other reconfigurable logic unit. In such case, the server node periodically may reprogram the FPGA to implement an updated or enhanced algorithm for processing or security purposes, for example, as subsequently developed.

Figure 2:
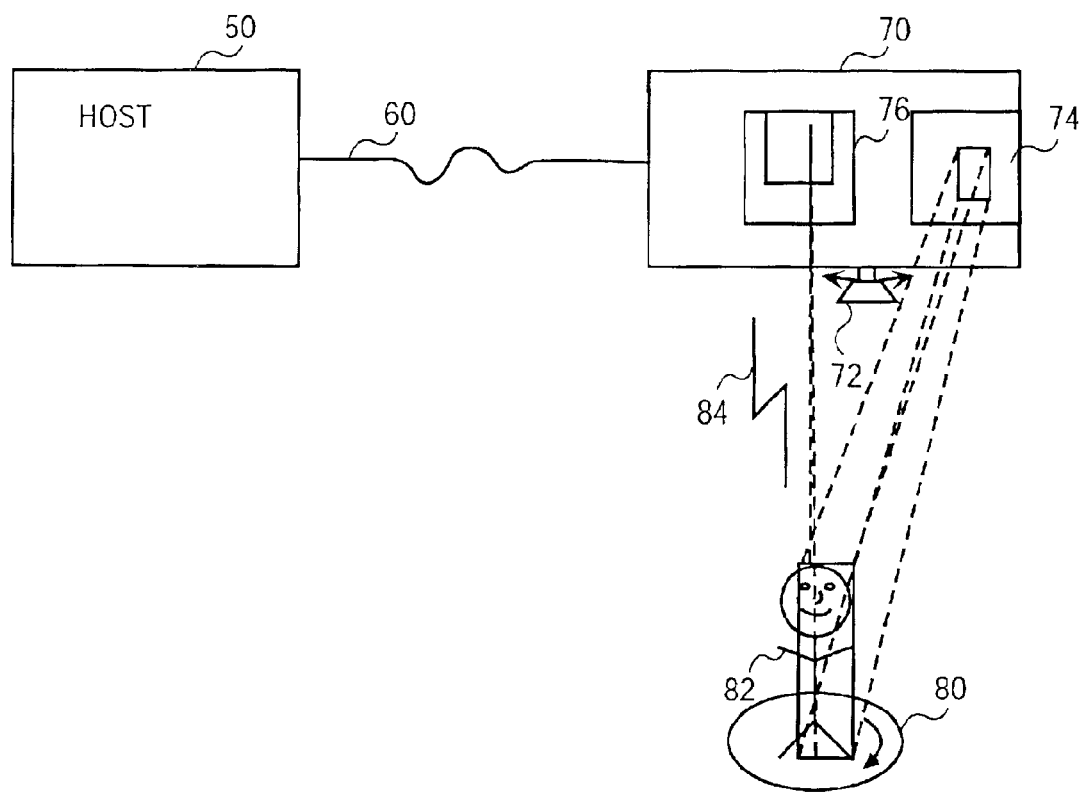
FIG. 2 is a block diagram of a subsystem of one embodiment of the invention.

FIG. 2 is a block diagram of a subsystem of one embodiment of the invention. The subsystem of FIG. 3 may be inserted in place of host 150, digitizer 120 and orientation fixture 180 of FIG. 1. Digitizer 70 is coupled to a host 50. This coupling may be by a bus 60 such as the Universal Serial Bus (USB), IEEE 1394 bus, or any other suitable data transfer system. It is also within the scope and contemplation of the invention for the digitizer to communicate with the host mode via a wireless interconnection. Host 50 may be a personal computer, a work station, an internet appliance, or any other device that provides sufficient intelligence and processing power to render images from the data obtained by the digitizer. The digitizer 70 captures image data and may forward it to the host 50 for rendering. In this way, the processing on the digitizer 70 may be limited, permitting lower cost construction. It is also within the scope and contemplation of the invention for the digitizer to render the image and deliver it directly to a distributed network. It is further within the scope and contemplation of the invention for the digitizer to deliver the data to a distributed network for rendering on a remote node.

The digitizer 70 includes a projector to project a stripe of white light through a projection window 74 onto a remote object such as a person 82 on a turntable 80 remote from the digitizer. The digitizer also contains an image sensing array (ISA) aligned with an image capture window 76 which captures the image of the object 82 within a focal zone. In one embodiment, the ISA is a linear charge coupled device (CCD) or complementary metal oxide semiconductor (CMOS) sensor, and the focal zone is a line on the target object. In some embodiments, the digitizer includes a base 72 about which the upper unit, including the projector and the ISA, can rotate in either direction. This permits the focal line to be swept back and forth across a target object through an arc. This sweeping reduces the loss of detail in the captured image that results from shadowing on the object from the perspective of an immobile focal line. The digitizer 70 also includes a wireless interface to communicate with a turntable 80 via a wireless link 84.

Turntable 80 may be the type described in co-pending application entitled WIRELESS TURNTABLE, Ser. No. 09/660,810, assigned to the assignee of the instant application. Via wireless link 84, the digitizer sends commands to the turntable 80 and receives from the turntable indications of the angular position of the turntable surface relative to a home position. When the digitizer is activated, it searches for the turntable 80 by sending a signal to which the turntable 80 is required to respond. If the turntable responds, the digitizer looks for a predetermined pattern that is expected to be present on the turntable surface. For example, the pattern may be concentric circles on the turntable surface. In such case, based on the image captured, the digitizer can both find the turntable and determine its distance from the digitizer. Then after the response is received, the digitizer sends a "go home" signal to the turntable. In some embodiments, the digitizer sends acceleration and rotation profiles to the turntable to control its rotation. Each profile may be retained in firmware on the digitizer or downloaded from host 50.

Generally speaking, the projection portion of the digitizer 70 is retained in fixed relation to the imaging portion. The projection portion produces a light stripe as noted previously on the object 82. By either sweeping the light stripe back and forth through the focal line or by mechanically blocking the stripe at a known rate, the intensity gradient can be created. In one embodiment, the blocking is from 0% to 100% during a cycle. Because the ISA integrates the illumination over time, the outline of a three-dimensional surface is reflected in the data captured by the ISA. This is because protruding features will remain illuminated longer. Accordingly, more photons are captured by the ISA corresponding to those features. After repeating this process one stripe at a time as the object is rotated by turntable 80 or through the course of sweeping the entire digitizer back and forth as it rotates about the base, cost effective three-dimensional imaging is effected.

In one embodiment, the system operates on the principle that depth data for a three-dimensional object may be calculated from an intensity difference resulting from an intensity gradient projected on the object. Existing image sensing arrays (ISAs) such as linear charge coupled device (CCD) sensors can detect illumination intensity to a high degree of accuracy. Based on this principle, if a light source is placed in fixed relation to the ISA such that the projected light forms an angle with the focal line of the ISA, and a gradient slide, for example, going from dark to light, from left to right, is interposed between the light source and the object, features of the object closer to the ISA are illuminated by greater intensity light than those features further away. Thus, the ISA captures a stripe of the object in which different intensities represent different depths of the object in that focal zone. This general principle works well for uniformly colored objects imaged in an otherwise dark environment, but different coloring and ambient light conditions may cause misinterpretations of the intensity data. However, if the ISA images the same stripe of the object under ambient conditions (e.g., when the light source is not illuminating the object within the focal zone) and images again when the object is illuminated by a uniform light (e.g., with no gradient (flat gradient)), these possible misinterpretations can be avoided.

Particularly, the ratio $V_{G1}-V_A/V_{G2}-V_A$ yields a differential that can be mapped to depth of the object. In the differential, $V_{G1}$ is the value from the ISA at a point resulting from the gradient exposure, $V_A$ is the value from the ambient exposure at that point, and $V_{G2}$ is the value at the point from a second gradient exposure such as the uniform light (flat gradient) or a second gradient created as described further below. The differential is computed for each point in the focal zone. Moreover, this differential also normalizes the effect of color variations and ambient light conditions. Notably, the differential is also substantially independent of intensity of the light source. Unfortunately, as a practical matter, changing slides and/or turning the light source on and off rapidly enough to permit digitization of many possible target objects is both expensive and problematic.

However, by taking advantage of the fact that the ISA integrates over time, the same effect may be created mechanically using a shutter which causes 0% to 100% of the light to illuminate the target object within the focal zone during the cycle. Moreover, by overdriving the shutter, the white light condition and ambient condition, can be created. Specifically, if the imaging time of the CCD is 5 milliseconds, in an initial 5 milliseconds the shutter does not impinge on the light source, thereby allowing the imaging sensing array to image the fully illuminated object. The next 5 milliseconds, the shutter passes from 0 to 100% blockage of the light, thereby creating the intensity gradient within the focal zone. During the next 5 milliseconds, the shutter continues to drive so that the light is entirely blocked and the ambient condition image is obtained. The processing of each of these images (including the creation of the differential) may be offloaded to an attached host as discussed in greater detail below.

An intensity gradient may alternatively be created by sweeping the light through the focal zone. For example, by sweeping a light stripe from left to right through the focal zone, the ambient light image may be captured before the light enters the zone. A first gradient is captured from the first entry of the light into the zone until the light is entirely within the zone. A second gradient is captured as a light translates out of the zone to the right. The second gradient is the opposite of the first gradient and is not flat as in the fully illuminated case. An analogous set of images may be captured as the light sweeps back from left to right. One advantage of sweeping the light is that two gradients are generated as the light moves from right to left and two gradients are generated as the light moves from left to right. Thus, the sweeping can be performed at half speed without a reduction in imaging performance.

The differential may take the same form as discussed above. Alternatively, the differential may be computed as $X_1/(X_1+X_2)$, where $X_1=V_{G1}-V_A$ and $X_2=V_{G2}-V_A$. To reduce noise sensitivity, the larger magnitude gradient should be selected for the numerator of the ratio. Color intensity is given by $X_1+X_2$.

Figure 3:
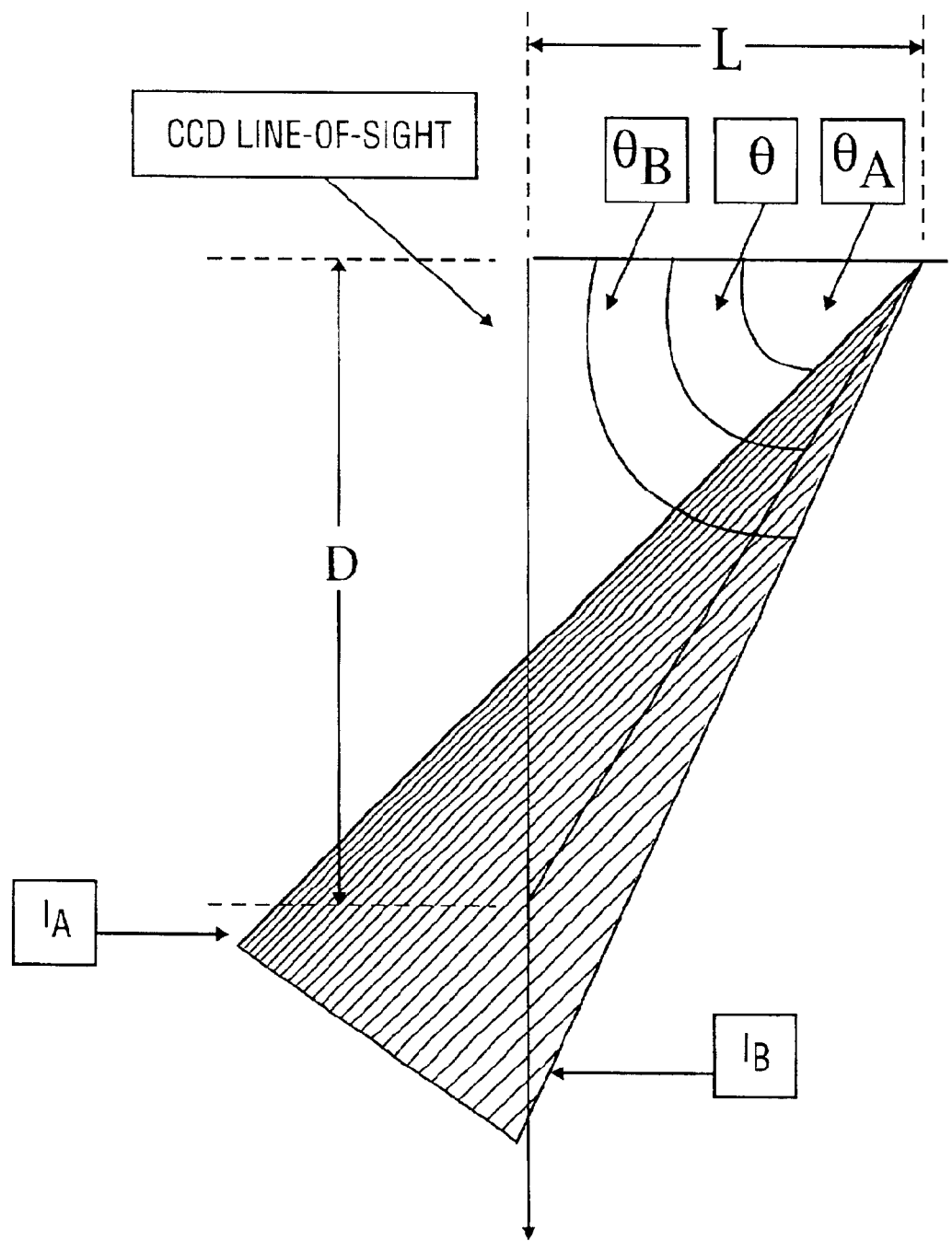
FIG. 3 shows a schematic diagram of a intensity gradient cone of one embodiment of the invention.

FIG. 3 shows a schematic diagram of a intensity gradient cone of one embodiment of the invention. This example has been simplified to include only a single capture of one gradient as might be applicable to uniformly shaped and colored objects in a dark environment. This example, of course, could be expanded to cover non-uniform cases as discussed above using intensity differentials. A light source is located a distance L along a line normal to a line of sight of a linear ISA. The light source projects a gradient having a minimum intensity $I_A$ and maximum intensity $I_B$. The angle $\theta_A$ corresponds to the angle between the minimum intensity edge of the projected gradient and the line normal to the ISA line of sight. $\theta_B$ corresponds to the angle defined by the maximum intensity edge of the projected gradient and the normal line. $\theta$ corresponds to the angle defined by a line from the gradient origin to the point on the target for which distance is to be determined and the normal line. Between $I_A$ and $I_B$, intensity is proportioned to the angle $\theta$ and is given by $I(\theta)=(I_B-I_A)[(\theta-\theta_A)/(\theta_B-\theta_A)]+I_A$.

Thus, angle as a function of intensity is given by $\theta(I)=(\theta_B-\theta_A)*[(I-I_A)/(I_B-I_A)]+\theta_A$. The distance D is the given by $D = L \cdot \tan \theta$. Therefore, distance as a function of intensity measured at the ISA is given by $D = L \cdot \tan \{(\theta_B - \theta_A) \cdot [(I - I_A)/(I_B - I_A)] + \theta_A\}$. In one embodiment, the light source is fixed relative to the ISA and the minimum and maximum intensities are known or can be calibrated at run time. This allows intensity derived during capture to be mapped easily to distance with limited computational complexity.

In one embodiment, depth measurements are determined on a pixel by pixel basis. Because intensity captured by the single pixel is independent of intensity captured by other pixels and intensity maps directly to depth, it is possible to achieve one depth measurement per pixel. Moreover, it would be possible to obtain a depth measurement from an image sensor having a single sensing element. In an alternative embodiment, adjacent groups of pixels may be treated as an element with the aggregate captured intensity used to determine the depth measurement without regard to an energy distribution among the pixels in the group. This yields one measurement per elementary group of pixels.

As indicated, it is possible to calculate the depth data directly from the intensity information. However, the speed and processing power required are reduced when a lookup table (LUT) based on a prior calibration is employed to derive depth data based on the differentials. This also allows nonidealities of the physical equipment to be accounted for in the selected LUT entity, based on the prior calibration. Accordingly, the embodiment of the invention maintains a LUT and indexes into the LUT based on the differential.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   capturing an intensity at a location on a surface in a single pixel of an image sensing array (ISA);
   converting the intensity into a measurement of distance to the location relative to a reference point independently of data from other pixels of the ISA and independent of time of flight of light reflected from the location to the single pixel; and
   comparing a plurality of captures of the intensity at the location under different conditions to compensate for non-homogeneous environments or surfaces.

2. The method of claim 1 wherein the ISA is a linear image sensor.

3. The method of claim 2 wherein the linear image sensor is one of a linear charge coupled device (CCD) and a photo diode array.

4. A method comprising:
   capturing an intensity at a location on a surface in a single pixel of an image sensing array (ISA);
   converting the intensity into a measurement of distance to the location relative to a reference point independently of data from other pixels of the ISA and independent of time of flight of light reflected from the location to the single pixel; and
   comparing a plurality of captures of the intensity at the location at different points in time to compensate for non-homogeneous environments or surfaces.

5. A method comprising:
   capturing an intensity at a location on a surface in an elementary group of pixels on an image sensing array (ISA) without regard to intensity distribution within the group;
   converting the intensity into a measurement of distance to the location independently of data from other pixels on the ISA and independently of time of flight of light reflected from the location to the elementary group of pixels; and
   comparing a plurality of captures of the intensity at the location at different points in time to compensate for non-homogeneous environments or surfaces.

6. The method of claim 5 wherein the ISA is a linear image sensor.

7. The method of claim 6 wherein the linear image sensor is one of a linear charge coupled device (CCD) and a photo diode array.

8. A method comprising:
   capturing an intensity at a location on a surface in an elementary group of pixels on an image sensing array (ISA) without regard to intensity distribution within the group;
   converting the intensity into a measurement of distance to the location independently of data from other pixels on the ISA and independently of time of flight of light reflected from the location to the elementary group of pixels; and
   comparing a plurality of captures of the intensity at the location under different conditions to compensate for non-homogeneous environments of surfaces.

9. A method comprising:
   capturing a spectral energy distribution returned from a location on a surface in a single pixel of an ISA;
   converting the spectral energy distribution into a measurement of distance the location relative to a reference point independently of data from other pixels of the ISA and independent of time of flight of light reflected from the location to the single pixel; and
   comparing a plurality of captures of the spectral energy distribution at the location at different points in time to compensate for non-homogeneous environments or surfaces.

10. A method comprising:
    altering one of a spatial and optical relationship between an image sensing array (ISA) and a surface;
    observing a variation of an electrical signal at a single pixel on the ISA responsive to the alteration;
    converting the variation to a measure of distance to a location on the surface relative to a reference point, independently of data from other pixels of the ISA and independent of time of flight of light reflected from the location to the single pixel; and
    comparing a plurality of captures of the electrical signal at the single pixel corresponding to the location on the surface at different points in time to compensate for non-homogeneous environments or surfaces.

11. A method comprising:
    altering one of a spatial and optical relationship between an image sensing array (ISA) and a surface;
    observing a variation of an electrical signal at an elementary group of pixels on the ISA without regard to variations in electrical signals within the group responsive to the alteration;
    converting the variation to a measure of distance to a location on the surface relative to a reference point, independently of data from other pixels of the ISA and independent of time of flight of light reflected from the location to the elementary group of pixels; and
    comparing a plurality of captures of the electrical signal at the elementary group of pixels corresponding to the location on the surface under different conditions to compensate for non-homogeneous environments or surfaces.

12. A method comprising:

capturing an intensity at a location on a surface in a single pixel of a linear image sensing array (ISA);

converting the intensity into a measurement of distance to the location relative to a reference point independently of data from other pixels of the linear ISA; and comparing a plurality of captures of the intensity at the location under different conditions to compensate for non-homogeneous environments or surfaces.

* * * * *